(12) United States Patent
Zhou et al.

(10) Patent No.: US 9,984,327 B2
(45) Date of Patent: May 29, 2018

(54) SYSTEM AND METHOD FOR PARALLEL GRAPH SEARCHING UTILIZING PARALLEL EDGE PARTITIONING

(75) Inventors: Rong Zhou, San Jose, CA (US); Tim Schmidt, Palo Alto, CA (US); Minh Binh Do, Palo Alto, CA (US); Serdar Uckun, Palo Alto, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 1494 days.

(21) Appl. No.: 12/842,363

(22) Filed: Jul. 23, 2010

(65) Prior Publication Data

US 2011/0313984 A1    Dec. 22, 2011

Related U.S. Application Data

(60) Provisional application No. 61/355,997, filed on Jun. 17, 2010.

(51) Int. Cl.
  *G06F 17/30* (2006.01)
  *G06N 5/00* (2006.01)
  *G06N 5/02* (2006.01)

(52) U.S. Cl.
  CPC .............. *G06N 5/003* (2013.01); *G06N 5/02* (2013.01)

(58) Field of Classification Search
  USPC .................................................. 707/758, 798
  See application file for complete search history.

(56) References Cited

U.S. PATENT DOCUMENTS

| | | | |
|---|---|---|---|
| 6,346,879 | B1 | 2/2002 | Peled |
| 7,430,670 | B1 * | 9/2008 | Horning et al. .............. 713/190 |
| 7,584,444 | B2 | 9/2009 | Zhou |
| 7,702,620 | B2 | 4/2010 | He et al. |
| 7,805,454 | B2 | 9/2010 | Zhou |
| 2005/0137839 | A1 | 6/2005 | Mansurov |
| 2006/0274070 | A1 | 12/2006 | Herman et al. |

(Continued)

OTHER PUBLICATIONS

Rong Zhou, Eric A. Hansen, Parallel Structured Duplicate Detection, Jul. 2007, AAAI-07 pp. 1-7.*

(Continued)

*Primary Examiner* — Mark D Featherstone
*Assistant Examiner* — Navneet Gmahl
(74) *Attorney, Agent, or Firm* — Fay Sharpe LLP

(57) ABSTRACT

A method and system for performing a graph search, includes constructing an abstract representation of the graph using state-space abstraction. The abstract representation of the graph includes one or more abstract nodes having duplicate detection scopes and one or more abstract edges having operator groups. The duplicate detection scopes of the abstract nodes are partitioned into smaller duplicate detection scopes using edge partitioning. The abstract edges include the smaller duplicate detection scopes. Nodes in the current search layer are expanded using the operator groups of outgoing abstract edges of the abstract nodes the nodes map to. The operator groups associated with abstract edges having disjoint duplicate detection scopes are used to expand the nodes in parallel. Once all the operator groups in the current search layer have been used for node expansion the method progresses to the next search layer.

20 Claims, 10 Drawing Sheets

(56) References Cited

U.S. PATENT DOCUMENTS

| | | | |
|---|---|---|---|
| 2008/0134207 A1* | 6/2008 | Chamieh | G06F 9/4428 719/315 |
| 2009/0024586 A1* | 1/2009 | Zhou | G06F 17/30958 |
| 2011/0010396 A1* | 1/2011 | Zhou | G06F 17/30958 707/798 |

OTHER PUBLICATIONS

Rong Zhou, Eric A. Hansen, Edge Partitioning in External-Memory Graph Search, 2007, IJCAI-07 pp. 2410-2416.*

European Search Report, Application No. 11169956.7-1225 / 2402892, dated Feb. 14, 2012; Completed Feb. 1, 2012, The Hague.

Belady, L., A study of replacement algorithms for virtual storage. IBM Systems Journal 5:78-101, 1966.

Dutt, S., et al., Scalable load balancing strategies for parallel A* algorithms. Journal of Parallel and Distributed Computing 22(3):488-505, 1994.

Grama, A., et al., State of the art in parallel search techniques for discrete optimization problems; IEEE Transactions on Knowledge and Data Engineering 11(1):28-35, 1999.

Haslum, P., et al., Admissible heuristics for optimal planning. In Proc. of the 5th International Conference on AI Planning and Scheduling, 140-149,2000.

Jabbar, S., et al., Parallel external directed model checking with linear I/O. In Proceedings of the 7th International Conference on Verification, Model Checking, and Abstract Interpretation (VMCAI 2006), 237-251,2006.

Korf, R. et al., Recent progress in heuristic search: A case study of the four-peg towers of Hanoi problem; In Proceedings of the 20th International Joint Conference on Artificial Intelligence (IJCAI-07), 2334-2329, 2007.

Korf, R., et al., Large-scale parallel breadth-first search. In Proc. of the 20th National Conference on Artificial Intelligence (AAAI-05), 1380-1385, 2005.

Kumar, V., et al., Parallel best first search of state-space graphs: A summary of results. In Proceedings of the 7th National Conference on Artificial Intelligence (AAAI-88), 122-127, 1988.

Niewiadomski, R., et al., Sequential and parallel algorithms for frontier A* with delayed duplicate detection. In Proceedings of the 21st National Conference on Artificial Intelligence (AAAI-06), 1039-1044, 2006.

Zhang, Y., et al., Parallel breadth first heuristic search on a shared-memory architecture. In Heuristic Search, Memory-Based Heuristics and Their Applications: Papers from the AAAI Workshop, 33-38. AAAI Press. Technical Report WS-06-08, 2006.

Zhou, R., et al, Sweep A*: Space-Efficient Heuristic Search in Partially Ordered Graphs. In Proceedings of the 15th IEEE International Conference on Tools with Artificial Intelligence (ICTAI-03), 427-434, 2003.

Zhou, R., et al., Structured duplicate detection in external-memory graph search. In Proceedings of the 19th National Conference on Artificial Intelligence (AAAI-04), 683-688, 2004.

Zhou, R., et al, External-memory pattern databases using structured duplicate detection, In Proceedings of the 20th National Conference on Artificial Intelligence (AAAI-05), 1398-1405, 2005.

Zhou, R., et al., Breadth-first heuristic search. Artificial Intelligence 170(4-5):385-408, 2006a.

Zhou, R., et al., Domain-independent structured duplicate detection. In Proceedings of the 21st National Conference on Artificial Intelligence (AAAI-06), 1082-1087, 2006b.

Zhou, R., et al., Edge partitioning in external-memory graph search. In Proceedings of the 20th International Joint Conference on Artificial Intelligence (IJCAI-07), 2410-2416, 2007.

Korf, "Best-First Frontier Search With Delayed Duplicate Detection", National Conference on Artificial Intelligence, American Association for Artificial Intelligence, 2004; pp. 650-657.

Stern, et al., "Using Magnetic Disk Instead of Main Memory in the MurvVerifier", Proceedings of 10th International Conference on Computer-Aided Verification, pp. 172-183, 1998.

Mehlhorn et al., "External-Memory Breadth-First Search with Sublinear I/O*", Proceedings of 10th Annual European Symposium on Algorithms, pp. 723-735, 2002.

Munagala et al., "I/O-Complexity of Graph Algorithms", Proceedings of 10 Symposium on Discrete Algorithms, pp. 687-694, 1999.

Edelkamp et. al., "External A*", Proceedings of the 27th German Conference on Artificial Intelligence, pp. 226-240, 2004.

Burns et al., Suboptimal and anytime heuristic search on multi-core machines. In Proceedings of the 19th International Conference on Automated Planning and Scheduling (ICAPS-09), 42-49, 2009a.

Burns et al., Bestfirst heuristic search for multi-core machines. In Proceedings of the 21st International Joint Conference on Artificial Intelligence (IJCAI-09), 449-455, 2009b.

Evett et al., PRA*: Massively parallel heuristic search. Journal of Parallel and Distributed Computing 25(2):133-143, 1995.

Haslum, et al., Domain-independent construction of pattern database heuristics for cost-optimal planning. In Proceedings of the 22nd Conference on Artificial Intelligence (AAAI-07), 1007-1012,2007.

Helmert, The fast downward planning system. Journal of Artificial Intelligence Research 26:191-246. Kishimoto, A.; Fukunaga, A.; and Botea, A. 2009. Scalable, parallel best-first search for optimal sequential planning. In Proceedings of the 19th International Conference on Automated Planning and Scheduling (ICAPS-09), 201-208, 2006.

Zhou, et al., Parallel Structured Duplicate Detection, 22nd Nat'l Conf. on Artificial Intelligence (AAAI-07), Vancouver, Canada, Jul. 2007.

Zhou, et al., Dynamic state-space partitioning in external-memory graph search. In the 2nd International Symposium on Combinatorial Search (SOCS-09), 2009.

Zhou, et al., Edge Partitioning in Parallel Structured Duplicate Detection, Proceedings of the 3rd Annual Symposium on Combinatorial Search (SOCS-10), 2010.

* cited by examiner

| PROBLEM | LEN | PSDD | | | | | PEP | | | |
|---|---|---|---|---|---|---|---|---|---|---|
| | | EXP | 1 THRD | 2 THRD | 7 THRD | \|G\| | EXP | 1 THRD | 2 THRD | 7 THRD | \|G\| |
| LOGISTICS-9 | 36 | 2,032,316 | 4.84 | 3.26 | 2.05 | 14,641 | 10,623,253 | 4.63 | 3.07 | 1.96 | 1,331 |
| DEPOTS-13 | 25 | 1,924,439 | 16.50 | 10.79 | 7.71 | 625 | 28,027,766 | 14.94 | 8.15 | 3.66 | 625 |
| SATELLITE-5 | 15 | 3,162,393 | 28.68 | 23.14 | 20.71 | 1,331 | 60,083,105 | 18.61 | 11.17 | 10.87 | 121 |
| ELEVATOR-12 | 40 | 24,223,337 | 84.00 | 47.13 | 22.81 | 1,600 | 76,038,474 | 58.69 | 32.28 | 12.46 | 64 |
| GRIPPER-8 | 53 | 66,906,969 | 95.30 | 64.10 | 48.59 | 3,600 | 348,411,069 | 50.88 | 46.39 | 39.97 | 180 |
| BLOCKS-10 | 34 | 119,755,718 | 202.44 | 129.56 | 77.23 | 2,197 | 949,979,726 | 215.47 | 154.65 | 132.29 | 169 |
| FREECELL-5 | 30 | 16,633,205 | 423.10 | 294.86 | 242.85 | 2,304 | 65,609,725 | 75.34 | 48.76 | 36.57 | 64 |
| DRIVERLOG-14 | 28 | 46,243,536 | 446.28 | 234.25 | 126.44 | 784 | 664,970,840 | 353.13 | 191.49 | 84.98 | 784 |

| PROBLEM | HDA* | | PBNF | |
|---|---|---|---|---|
| | 2 THRD | 7 THRD | 2 THRD | 7 THRD |
| LOGISTICS-9 | 6.67 | 3.39 | 4.14 | 2.28 |
| DEPOTS-13 | 15.48 | 6.27 | 10.13 | 9.20 |
| SATELLITE-5 | 28.86 | 11.05 | 59.20 | MEM |
| ELEVATOR-12 | 96.58 | 50.66 | 31.34 | 12.85 |
| GRIPPER-8 | 178.83 | 58.26 | 89.79 | 67.97 |
| BLOCKS-10 | MEM | MEM | MEM | MEM |
| FREECELL-5 | MEM | MEM | 183.75 | 226.90 |
| DRIVERLOG-14 | MEM | MEM | MEM | MEM |

FIG. 10

| # | LEN | PSDD | | PEP | |
|---|---|---|---|---|---|
| | | 2 THRD | 7 THRD | 2 THRD | 7 THRD |
| 17 | 66 | 810.14 | 315.14 | 294.43 | 190.62 |
| 53 | 64 | 594.92 | 213.79 | 238.06 | 154.04 |
| 56 | 55 | 398.54 | 156.92 | 183.16 | 121.99 |
| 59 | 57 | 561.94 | 240.54 | 212.66 | 141.82 |
| 92 | 57 | 521.49 | 191.97 | 192.65 | 128.76 |

FIG. 11

SYSTEM AND METHOD FOR PARALLEL GRAPH SEARCHING UTILIZING PARALLEL EDGE PARTITIONING

This application claims the benefit of U.S. Provisional Application No. 61/355,997, filed Jun. 17, 2010, incorporated herein by reference in its entirety.

BACKGROUND

The present exemplary embodiments relate generally to search algorithms. They find particular application in conjunction with graph searches, and will be described with particular reference thereto. However, it is to be appreciated that the present exemplary embodiments are also amenable to other like applications.

Graph searching mostly accounts for the heavy-lifting in many areas of high performance computing and artificial intelligence (AI), such as planning, scheduling, combinatorial optimization, and model checking. This is because these tasks generally include searching graphs having exponential size in the depth of the search. Thus, finding an optimal or even approximate solution can take a long time, and the ability to scale up to larger problems is to a large degree dependent on the speed of the underlying graph-search algorithm.

One ubiquitous approach to speeding up graph searching is to efficiently utilize the increasing number of parallel processing units available in modern systems, such as multiple, multi-core CPUs and GPUs. Under this approach, the prime challenge to efficiency is duplicate-detection, specifically the overhead of communicating potential duplicates to all involved processes. Most existing parallel graphs search algorithms circumvent this issue by ignoring duplicates such that communications are restricted to distributing root states of local searches and their termination signals. This is acceptable as long as problem graphs are trees, which lend themselves conveniently to parallelization. The topology of a tree guarantees that there is only one unique path from the root to any node in the tree and thus no duplicates will be encountered. However, for most search problems, the most natural and succinct representation of the search space is not a tree; rather, it is a graph having many alternative paths between a pair of nodes. Failing to consider duplicates in graphs having multiple ways of reaching the same node can result in the search space becoming exponentially large. Furthermore, in the worst case, the presence of duplicates can result in the searches of all but one participating process being superfluous (e.g., when the root nodes of all other processes happen to be superfluous duplicates of nodes in said process), leading to these algorithms performing (in some cases exponentially) worse than state-of-the-art single-threaded algorithms.

A traditional method of addressing duplicates involves storing global Open and Closed lists to check for duplicates. However, this method may suffer from prohibitive communication and/or synchronization overhead in parallel search, since efforts must be made to avoid race conditions among multiple processing units. Further, even if the Open and Closed lists are divided into smaller pieces and distributed across different processors, significant communications overhead can occur, if, for example, one processor generates nodes that belong to a different processor.

A class of parallel graph search algorithms using a hash function to distribute the search nodes among multiple processors (or cores) mitigates some of the foregoing concerns. One such example is the PRA* algorithm (for more information, see Matthew P. Evett et al., PRA*: Massively Parallel Heuristic Search, J. Parallel Distrib. Comput. 25(2), 133-143 (1995)). However, since general purpose hash functions are static and do not adapt to a particular problem instance, these algorithms are generally incapable of exploiting problem-specific structures for improved parallel efficiency.

To illustrate, assume a 100 machine cluster having perfect load balancing (i.e., each machine gets 1% of the total workload). When the successors of a node are generated, there is a 99% chance that they belong to machines other than the one that generated them, since the hash function would distribute these newly generated successors equally among all 100 machines. In general, the number of machine-to-machine communication channels needed for PRA* (or any parallel algorithm that uses a regular hash function to distribute search nodes among machines) is on the order of the number of machines squared. For a cluster of one thousand machines, PRA* needs roughly 1,000,000 one-way machine-to-machine channels, which are difficult to sustain in a high-performance computing network.

Parallel structured duplicate-detection overcomes this problem by using a locality-preserving abstraction to extract parallelism. Namely, using a state-space projection function, a state space of a graph is statically divided into disjoint regions, each forming an abstract state. Then, two abstract states y and y' are connected by an abstract edge (or abstract operator) if and only if (a) there exists a pair of states x and x' such that y and y' are the images (abstractions) of x and x' under the state-space projection function, respectively, and (b) x' is a direct successor of x in the original state space. The state-space projection function is selected in such a way that the successors of any state mapping to a disjoint region are guaranteed to map to only a small subset of regions (i.e., preserving the locality of the search graph) and that such mapping can be computed very efficiently (e.g., by simply ignoring some state variables or by shrinking the domain sizes of some state variables).

By mapping each encountered node to its corresponding abstract node, the abstract graph can be used to efficiently determine a duplicate-detection scope for each node. That is, potential duplicates can be detected in the set of all nodes mapping to abstract nodes that are successors of the abstract node to which the currently expanding node maps. Now any two nodes with pair wise disjoint duplicate-detection scopes can be expanded in parallel without any need for communications. Through the use of coarse abstractions (i.e., a large number of nodes mapping to the same abstract node), a layer of the search graph can be expanded with very little communication overhead by assigning abstract nodes with disjoint neighborhoods to different processes.

However, even with the most sophisticated locality-discovering algorithm, there is no guarantee that such a local structure always exists in any given problem. This is notwithstanding that it has been shown that many planning problems do have the appropriate local structure that can be leveraged by parallel structured duplicate-detection (PSDD), as well as by other locality-aware search algorithms. The search graph of the well-known Hidden Markov Models (HMMs) is one such example of a problem lacking local structure, illustrated in FIG. 1.

HMMs seek to compute the most probable sequence of hidden states that results in a sequence of observed events, and, as can be seen, the search graph has a layered structure (a layer can correspond to all the states the system can be in at time point $t_i$, for example). Because any node in one layer has all the nodes in the next layer as its successors, the graph has no locality at all between any two consecutive layers. Not surprisingly, PSDD cannot be applied in this case, since a successor node in the next layer could be generated from any node in the current layer, which prevents PSDD from partitioning the search space in a way that would allow parallel node expansions.

Formally, the locality of an abstraction can be expressed as the ratio between maximum out-degree and the size of the induced abstract graph. An abstraction captures the locality of the original search graph, if the ratio of the corresponding abstract graph is minimal. Of course, for abstract graphs that are fully connected with self-loops such as those for HMMs, they have a ratio of 1 and possess no such locality, since the number of successors for any abstract state is the entire set of abstract states.

Although there is another technique called delayed duplicate-detection (DDD) that could, in principle, allow parallel node expansions in this case, it has the drawback that duplicates are not eliminated as soon as they are generated, which is particularly problematic for HMMs, because the number of duplicates generated and stored for a layer of the search graph is equal to the number of hidden states squared, as opposed to just the number of hidden states if duplicates were eliminated. For systems with a large number of hidden states the difference can be huge.

Accordingly, it would be advantageous to have an algorithm that enables large-scale parallel search with immediate duplicate detection and low synchronization overhead for problems that do not admit simple decomposition schemes.

INCORPORATION BY REFERENCE

The following patents/applications and articles are each incorporated herein in there entireties:

U.S. patent application Ser. No. 11/612,523 for "System and Method for External-Memory Graph Search Utilizing Edge Partitioning," by Rong Zhou, filed Dec. 19, 2006;

U.S. patent application Ser. No. 11/879,696 for "System and Method for Parallel Graph Search Utilizing Parallel Structured Duplicate-detection," by Rong Zhou, filed Jul. 18, 2007;

Burns, E.; Lemons, S.; Ruml, W.; and Zhou, R. 2009a. Suboptimal and anytime heuristic search on multi-core machines. In *Proceedings of the 19th International Conference on Automated Planning and Scheduling (ICAPS-09)*, 42-49;

Burns, E.; Lemons, S.; Zhou, R.; and Ruml, W. 2009b. Bestfirst heuristic search for multi-core machines. In *Proceedings of the 21st International Joint Conference on Artificial Intelligence (IJCAI-09)*, 449-455;

Evett, M.; Hendler, J.; Mahanti, A.; and Nau, D. 1995. PRA*: Massively parallel heuristic search. *Journal of Parallel and Distributed Computing* 25(2):133-143;

Haslum, P.; Helmert, M.; Bonet, B.; Botea, A.; and Koenig, S. 2007. Domain-independent construction of pattern database heuristics for cost-optimal planning. In *Proceedings of the 22nd Conference on Artificial Intelligence (AAAI-07)*, 1007-1012;

Helmert, M. 2006. The fast downward planning system. *Journal of Artificial Intelligence Research* 26:191-246. Kishimoto, A.; Fukunaga, A.; and Botea, A. 2009. Scalable, parallel best-first search for optimal sequential planning. In *Proceedings of the 19th International Conference on Automated Planning and Scheduling (ICAPS-09)*, 201-208;

Zhou, R., and Hansen, E. 2004. Structured duplicate detection in external-memory graph search. In *Proceedings of the 19th National Conference on Artificial Intelligence (AAAI-04)*, 683-688;

Zhou, R., and Hansen, E. 2006a. Breadth-first heuristic search. *Artificial Intelligence* 170(4-5):385-408.

Zhou, R., and Hansen, E. 2006b. Domain-independent structured duplicate detection. In *Proceedings of the 21st National Conference on Artificial Intelligence (AAAI-06)*, 1082-1087;

Zhou, R., and Hansen, E. 2007a. Parallel structured duplicate detection. In *Proceedings of the 22nd AAAI Conference on Artificial Intelligence (AAAI-07)*, 1217-1223;

Zhou, R., and Hansen, E. 2007b. Edge partitioning in external memory graph search. In *Proceedings of the 20th International Joint Conference on Artificial Intelligence (IJCAI-07)*, 2410-2416; and, Zhou, R., and Hansen, E. 2009. Dynamic state-space partitioning in external-memory graph search. In *the 2nd International Symposium on Combinatorial Search (SoCS-09)*.

BRIEF DESCRIPTION

According to one aspect of the present application, a method is provided for searching a graph in parallel. The method constructs an abstract representation of the graph using state-space abstraction. The abstract representation of the graph includes one or more abstract nodes having duplicate detection scopes and one or more abstract edges having operator groups. The duplicate detection scopes of the abstract nodes are partitioned into smaller duplicate detection scopes using edge partitioning. The abstract edges include the smaller duplicate detection scopes. Nodes in the current search layer are expanded using the operator groups of outgoing abstract edges of the abstract nodes the nodes map to. The operator groups associated with abstract edges having disjoint duplicate detection scopes are used to expand the nodes in parallel. Once all the operator groups in the current search layer have been used for node expansion the method progresses to the next search layer.

According to another aspect of the present application, a method is provided for searching a graph. The method constructs an abstract representation of the graph using state-space abstraction. The abstract representation of the graph includes one or more abstract nodes having duplicate detection scopes and one or more abstract edges. The outgoing edges of the graph are partitioned based on the abstract representation of the graph. The partitioning includes grouping edges that map to a same abstract edge of the abstract representation together as an operator group. Different operator groups are assigned to multiple processing units until a termination condition is met and the graph is searched using the abstract representation of the graph. The multiple processing units use the different operator groups to generate successor nodes in parallel. While successors are being generated, the graph is searched.

BRIEF DESCRIPTION OF THE DRAWINGS

FIG. 9 illustrates experimental results comparing PSDD and PEP on STRIPS planning problems;

FIG. 10 illustrates experimental results comparing HDA* and PBNF on STRIPS planning problems; and, FIG. 11 illustrates experimental results comparing PSDD and PEP on 5 hard instances of the 15-Puzzle.

DETAILED DESCRIPTION

The following discussion describes a parallel graph searching algorithm utilizing edge partitioning. The algorithm builds on structured duplicate detection and uses state-space abstraction to decompose a search graph. It then uses edge partitioning to extract locality and allow parallel node expansion. Advantageously, the algorithm is not dependent upon the innate locality of the search graph. Namely, by subdividing operator sets of the search graph using edge partitioning, the algorithm can extract locality. The algorithm can even go so far as to extract locality from graphs that do not have any intrinsic locality.

1.0 STRUCTURED DUPLICATE DETECTION

Structured duplicate detection (SDD) was originally developed as an approach to external-memory graph search. It leverages local structure in a graph to partition stored nodes between internal memory and disk in such a way that duplicate detection can be performed immediately, during node expansion, instead of being delayed. The local structure that is leveraged by this approach is revealed through use of state space abstraction.

State-space abstraction corresponds to the idea of abstracting a state-space graph into an abstract state-space graph. This abstract graph is generated through the use of a state-space projection function, which is a many-to-one mapping from the original state-space to an abstract state-space, in which each abstract state (i.e., abstract node) corresponds to a set of states (i.e., nodes) in the original state-space. A state-space projection function is created by ignoring some state variables.

Given a state-space graph and state-space projection function, the abstract state-space graph may be constructed as follows. The set of nodes, called abstract nodes, in the abstract graph correspond to the set of abstract states. An abstract node y' is a successor of an abstract node y if and only if there exist two states x' and x in the original state-space, such that (i) x' is a successor of x, and (ii) x' and x map to y' and y, respectively, under the state-space projection function. If a state x is mapped to an abstract state y, then y is called the image of x.

Figure 2:
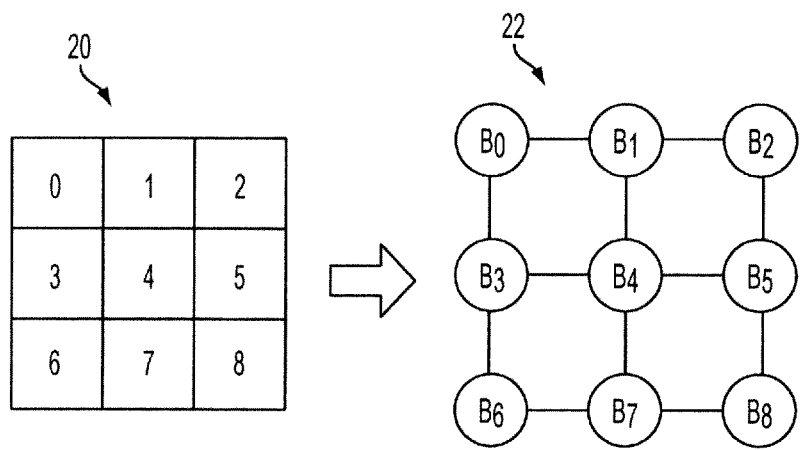
FIG. 2 illustrates an "Eight Puzzle" panel with all possible positions of a blank for the Eight Puzzle, and an abstract state-space graph created by a state-space projection function that considers the position of the "blank" only.

To illustrate, if the positions of all tiles in the Eight Puzzle 20 of FIG. 2 are ignored and only the position of the "blank" is considered, an abstract state-space graph 22 is obtained that has only nine abstract states ($B_0$-$B_8$), one corresponding to each possible position of the blank. The abstract state-space graph 22 created by this simple state-space projection function maps a state into an abstract state based only on the position of the blank. Therefore, each abstract node $B_i$ in FIG. 2 corresponds to the set of states with the blank located at position i of the Eight Puzzle 20.

In SDD, stored nodes in the original search graph are divided into "nblocks," where an nblock corresponds to a set of nodes that map to the same abstract node. Given this partition of stored nodes, SDD uses the concept of duplicate-detection scope to localize memory references. The duplicate-detection scope of a node x in the original search graph is defined as all stored nodes (or equivalently, all nblocks) that map to successors of the abstract node y that is the image of node x under the projection function.

The concept of duplicate-detection scope allows a search algorithm to check duplicates against a fraction of stored nodes, and still guarantee that all duplicates are found. An external-memory graph search algorithm can use RAM to store nblocks within the current duplicate-detection scope, and use disk to store other nblocks when RAM is full. SDD is designed to be used with a search algorithm that expands a set of nodes at a time, such as breadth-first search, where the order in which nodes in the set are expanded can be adjusted to minimize disk I/O. SDD's strategy for minimizing disk I/O is to order node expansions such that changes of duplicate-detection scope occur as infrequently as possible, and involve change of as few nblocks as possible. When RAM is full, nblocks outside the current duplicate-detection scope are flushed to disk. When expanding nodes in a different nblock, any nblocks in its duplicate-detection scope that are stored on disk are swapped into RAM.

SDD has been shown to be an effective approach to external-memory graph search in solving problems as diverse as the Fifteen Puzzle, the Four-Peg Towers of Hanoi, multiple sequence alignment, and domain-independent STRIPS planning. For domain-independent STRIPS planning, the state-space projection function that is used by SDD is created automatically, and adapted to the search graph of each planning domain.

2.0 PARALLEL STRUCTURED DUPLICATE DETECTION

Parallel structured duplicate detection (PSDD) is an extension of structure duplicate detection that leverages the same local structure used to localize memory references in external-memory graph search in order to reduce the number of synchronization operations needed in parallel graph search. In PSDD, graph search is parallelized by assigning each idle processor an nblock to expand, where the key idea is to use the abstract graph to find nblocks to expand whose duplicate detection scopes are pairwise disjoint, since they can be searched in parallel without any synchronization (i.e., locking). Note that two duplicate-detection scopes are disjoint if they do not share any nblocks; thus, the condition that the duplicate-detection scopes of expanding nblocks are pairwise disjoint ensures memory reference locality.

Synchronization among processes is only necessary after a process has finished expanding all nodes in its current nblock and needs to acquire a new nblock. An nblock b is free to be assigned to a process if and only if none of its successors are being used, which is to say, its duplicate-detection scope is disjoint from the duplicate detection scope of every currently-expanding nblock. Free nblocks are found by explicitly tracking σ(b), the number of nblocks among b's successors that are in use by another process. An nblock can only be acquired when its σ=0. Thus, PSDD only uses a uses a single lock, controlling manipulation of the abstract graph, and it is only acquired by processes when finding a new free nblock to search.

3.0 EDGE PARTITIONING

The applicability of SDD depends on whether the state-space projection function that is used to create the abstract graph captures local structure in the original search graph. While it has been shown that many planning problems do have local structure that can be leveraged by SDD, there is no guarantee that such local structure exists for a given problem. Edge partitioning is an enhancement of SDD that resolves this problem and guarantees that memory references can be localized, even in cases when a search graph has no apparent local structure.

In edge partitioning, the duplicate detection scope of an nblock is no longer defined as the set of all successor nblocks in the abstract graph; instead, it is defined as the single successor nblock along a particular outgoing edge in the abstract graph. This reflects the fact that, with edge partitioning, the nodes in an nblock are expanded incrementally. At each stage, an operator group corresponding to a different abstract edge is applied; all operators of the operator group are applied to every node in the nblock before any other operator groups are considered. At the next stage, a different outgoing abstract edge is considered and a different operator group is applied to the same set of nodes. Eventually, all operator groups are applied to the nblock of nodes and the nodes become fully expanded. Note that full expansion of a node requires a sequence of incremental expansions.

Figure 3:
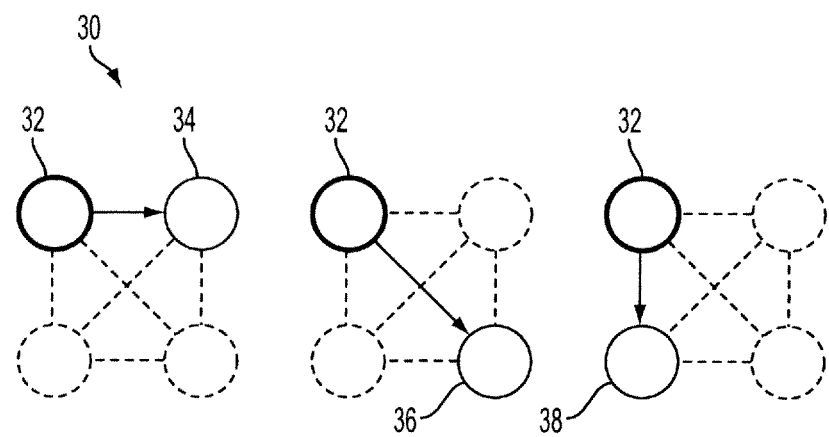
FIG. 3 illustrates how edge partitioning is used.

FIG. 3 provides an illustration of edge partitioning. Therein, a $K_4$ abstract graph 30 (i.e., a fully connected abstract graph with 4 nodes) is shown in which nodes mapping to an abstract node 32 (shown in double circles) are incrementally expanded from left to right. Tracking from left to right, nodes mapping to abstract node 32 are expanded using the operator group associated with the abstract edge connecting abstract nodes 32 and 34. Thereafter, nodes mapping to abstract node 32 are expanded using the operator group associated with the abstract edge connecting abstract nodes 32 and 36. Lastly, nodes mapping to abstract node 32 are expanded using the operator group associated with the abstract edge connecting abstract nodes 32 and 38. In each of these expansion stages, the duplicate-detection scopes encompass only a single abstract node. Namely, the nodes mapping to the destination of relevant abstract edge.

Edge partitioning has been used to improve the performance of external-memory graph search using SDD. As long as the set of nodes in each nblock fits in RAM, SDD with edge partitioning is effective regardless of whether the abstract graph captures local structure. Another advantage of edge partitioning is that it reduces the internal-memory requirements of external-memory graph search, allowing improved scalability.

3.1 Operator Grouping

Before discussing operator grouping in detail, it is pointed out that an "operator" here refers to an instantiated (or grounded) operator. For example, the Eight Puzzle has a total of 192 grounded operators, even though there are only four (left, right, up, and down) operators prior to instantiation.

Operator grouping in edge partitioning is built on top of state abstraction. In this example, O will be the set of all instantiated operators of a search problem. An operator o∈O is applicable to an abstract node y if and only if there exists a state x in the original state-space, such that (i) o is applicable to x, and (ii) x maps to y. Consider the Eight Puzzle. There are 2×8=16 operators that are applicable to abstract node $B_0$, because the blank, when located at the top-left corner of the puzzle board, can move either right ($B_0 \rightarrow B_1$) or down ($B_0 \rightarrow B_3$), and each move has 8 different instantiations, depending on which tile of the Eight Puzzle is moved into the blank position. Similarly, each of the abstract nodes $B_2$, $B_6$, and $B_8$ has 16 applicable operators. Abstract nodes $B_1$, $B_3$, $B_5$, and $B_7$ each have 3×8=24 applicable operators, and abstract node $B_4$ has 4×8=32 applicable operators. Thus $B_0$=16, $B_1$=24, $B_2$=16, $B_3$=24, $B_4$=32, $B_5$=24, $B_6$=16, $B_7$=24 and $B_8$=16, which are the 192 grounded operators.

Once the set of applicable operators for each abstract node is determined, operator grouping identifies, for each applicable operator, the abstract edge with which it is associated. An abstract edge (y,y') is an edge in the abstract graph that connects a pair of abstract nodes y and y', if and only if y' is a successor of y. From now on, y (y') is referred to as the source (destination) of abstract edge (y,y').

Further in this example, $O_y$ will be the set of operators applicable to abstract node y. An operator o∈$O_y$ is associated with an abstract edge (y, y') if and only if there exists two states x and x' in the original state-space, such that (i) o is applicable to x, (ii) x' is the resulting state after applying o to x, and (iii) x and x' map to y and y', respectively. For operators with deterministic effects, it is easy to see that for every o∈$O_y$, there is a unique abstract edge (y,y') that o is associated with. Essentially, there is a many-to-one mapping from the operator space to the abstract-edge space.

To exploit local structure in the operator space, edge partitioning uses operator grouping to divide the set of applicable operators $O_y$ for abstract node y into operator groups, one for each successor of y in the abstract graph. An operator group $O_{y,y'}$ is a subset of $O_y$ that consists of all the operators that are associated with abstract edge (y, y'). Note that $O_{y,y'} \cap O_{y,y''} = \emptyset$ for all y'≠y", and $$\bigcup_{y' \in successors(y)} O_{y,y'} = O_y \qquad (1)$$

where successors(y) is the set of successors of y in the abstract graph.

Although the technique of operator grouping is presented here in the context of searching implicitly-represented graphs (i.e., graphs represented by a start state and a set of operators for generating successors), it should be clear that the same technique applies with little modification to searching explicitly-represented graphs (i.e., graphs represented by a set of vertices and a set of edges).

4.0 PARALLEL EDGE PARTITIONING

Parallel edge partitioning builds on the concepts of state-space abstraction and edge partitioning to extract locality for purposes of parallel graph searching. It can be used in both shared and distributed memory parallelization. But for simplicity, the discussion hereafter speaks only of using this approach to reduce synchronization overhead in shared-memory parallelization rather than communication overhead in distributed-memory parallelization, since the principle remains the same for both parallel settings.

The idea of parallel edge partitioning (PEP) follows from the recognition that reducing the duplicate detection scope also reduces the degree of contention between concurrent search processes. This has the effect of increasing the degree of concurrency that is allowed in parallel search. Below are formal definitions of the maximum concurrency of parallel search.

Definition 1: The maximum concurrency of parallel search is the maximum number of parallel processes allowed during search such that no synchronization is needed for concurrent node expansions in these processes.

Lemma 1: The maximum concurrency of parallel structured duplicate detection is the maximum number of disjoint duplicate-detection scopes in the abstract state-space graph.

The above lemma applies to parallel structured duplicate detection, regardless of whether it is used in combination with edge partitioning or not. However, edge partitioning increases the maximum concurrency, because it changes the definition of duplicate-detection scope, thus increasing the number of disjoint duplicate-detection scopes that can be found in the same abstract state-space graph.

Definition 2: An edge-partitioned duplicate-detection scope of a node x, with respect to an abstract edge (y, y'), under a state-space projection function Π corresponds to the set of stored nodes that map to abstract node y'.

The duplicate-detection scope for an abstract edge (y,y'), is guaranteed to contain:
1) only nodes that map to a single abstract node y' (the destination of the abstract edge), and
2) all the potential duplicates for those successors generated by applying operator group $O_{y,y'}$ to the set of nodes that map to abstract node y (the source of the abstract edge), where an operator group $O_{y,y'}$ is a subset of $O_y$, the set of applicable operators for abstract node y, that consists of all the operators that are associated with abstract edge (y, y').

The above properties are appealing because together they guarantee that edge partitioning only needs to store a single nblock of nodes in RAM, yet it is still guaranteed to catch all the duplicates that can be generated in the worst case. But, in the context of internal-memory search in which everything fits in RAM anyway, one may wonder if these two properties lose their appeal. As shown next, this is not the case.

Theorem 1: The maximum number of disjoint duplicate detection scopes under structured duplicate detection (without edge partitioning) is bounded by the size of the abstract state-space graph divided by the minimum out-degree of the abstract graph.

$$\left\lfloor \frac{\text{size of abstract graph}}{\text{minimum out} - \text{degree of abstract graph}} \right\rfloor \quad (2)$$

Proof: An abstract node with the minimum out-degree has the fewest number of successors, which in turn produces the smallest duplicate-detection scope (in terms of the number of nblocks). Suppose an abstract graph can be partitioned into k disjoint scopes. Since the same abstract node cannot appear in more than one scope, the value of k cannot exceed the total number of abstract nodes divided by the size of the smallest scope or, equivalently, the minimum out-degree.

For all practical purposes, the minimum out-degree should be replaced by the average out-degree of the abstract graph when using Theorem 1, although in rare cases this may underestimate the true maximum concurrency.

Corollary 1: The maximum concurrency of parallel structured duplicate detection (without edge partitioning) is bounded by the size of the abstract state-space graph divided by the minimum out-degree of the abstract graph.

Corollary 2: The maximum concurrency of parallel structured duplicate detection (without edge partitioning) on a fully connected abstract state-space graph is one (i.e., no concurrency).

The above two Corollaries follow straightforwardly from Lemma 1 and Theorem 1. According to Corollary 2, parallel structured duplicate detection loses its ability to extract parallelism out of an abstract graph (and the corresponding search graph) if it is fully connected, and the maximum concurrency allowed is only a single search process, if any synchronization-free period of node expansions needs to be guaranteed.

Figure 1:
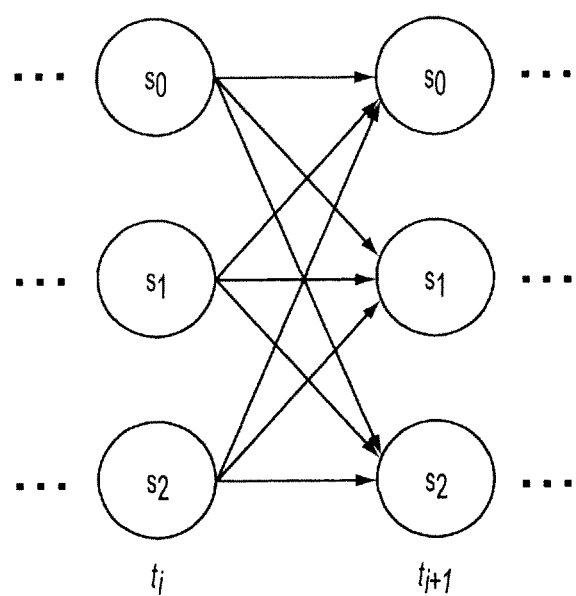
FIG. 1 illustrates a portion of a search graph of Hidden Markov Models with three hidden states.

As can be seen in FIG. 1, the issue with a fully connected abstract graph is that any duplicate-detection scope would consume the entire graph, which precludes the existence of disjoint scopes. But with edge partitioning, any duplicate-detection scope contains only a single bucket (i.e., nblock) of nodes, while still guaranteeing that no synchronization is necessary when expanding nodes that map to the source bucket of the abstract edge. Note that multiple search processes can expand nodes in the same source bucket, as long as the successors that can be generated all map to different buckets other than the source bucket.

Theorem 2: The (maximum) number of disjoint duplicate detection scopes under edge partitioning is the size of the abstract state-space graph.

Corollary 3: The maximum concurrency of parallel edge partitioning is equal to the size of the abstract state-space graph.

These are straightforward results, given the property that the edge-partitioned duplicate-detection scope of any node is always a single bucket. They are also more meaningful than similar results for parallel structured duplicate detection without edge partitioning, since they reveal precisely the (maximum) number of disjoint scopes and the maximum concurrency, unlike Theorem 1 and Corollary 2, which only put an upper bound on these numbers.

Theorem 3: For any given state-space projection function, the maximum concurrency of any parallel search algorithm is bounded by the size of the abstract state-space graph if duplicates must be detected as soon as they are generated.

Proof: Suppose the size of the abstract graph is k and yet the maximum concurrency of the parallel search is greater than k. Without loss of generality, assume there is a (k+1)-th process that can join the other k processes with no synchronization. Since duplicates must be caught as soon as they are generated, this means the (k+1)-th process must be given exclusive access to its duplicate-detection scope, which consumes at least one abstract node. But since there are only k abstract nodes, according to the pigeonhole principle, there must be one abstract node that is shared by two processes and they must synchronize with each other to perform duplicate detection simultaneously. This leads to a contradiction, which proves the (k+1)-th process must not exist, and instead the Theorem must hold.

According to Theorem 3, parallel edge partitioning is optimal in the sense that no other algorithm can achieve a higher level of maximum concurrency without either compromising duplicate detection or changing the state-space projection function. Theorem 3 also informs the set up of our computational experiments, because if all parallel search algorithms are forced to use the same state-space projection function with a low resolution, one can easily make parallel edge partitioning the best of all. Thus, projection functions that are best suited for each individual algorithm used in following experiments are used.

In view of the foregoing, parallel edge partitioning can be summarized as follows. For each search layer, non-interfering operator groups therein are distributed to a plurality of processing units until all the operator groups are applied. The criterion for choosing non-interfering operator groups is quite simple: as long as no two operator groups share the same destination abstract state, they can be used simultaneously without synchronization (or communication) during parallel node expansions, since it is guaranteed that the set of successors generated by one operator group cannot overlap with those generated by other operator groups. In other words, each processing unit only needs to focus on duplicate-detection locally (i.e., within a single abstract state), and the global duplicate-detection aspect is handled by parallel edge partitioning in a synchronization-free way.

Figure 4:
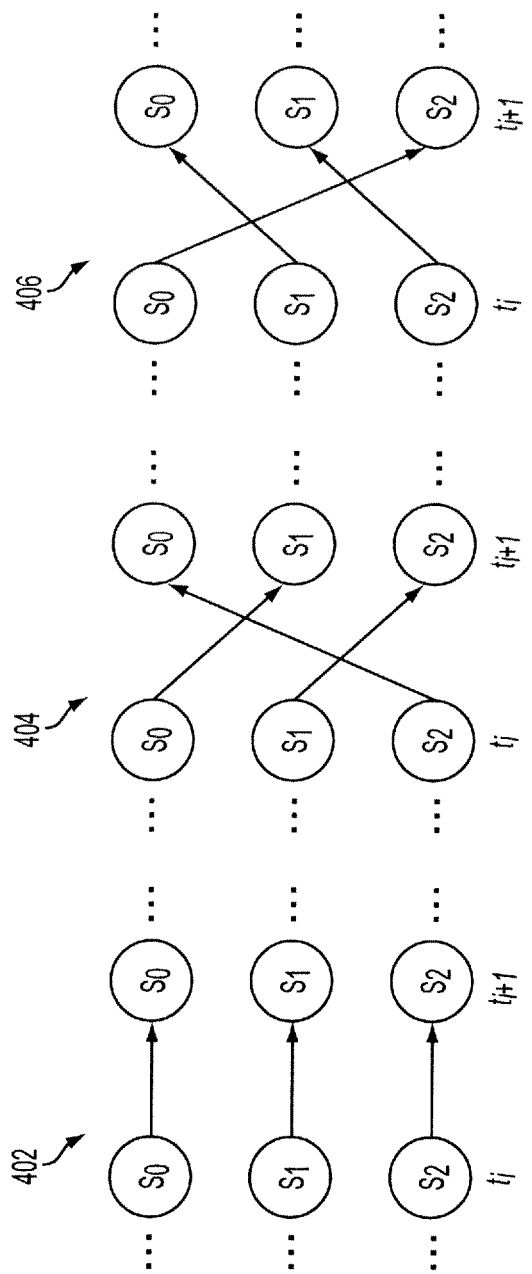
FIG. 4 illustrates three incremental node expansion stages of parallel edge partitioning.

With reference to FIG. 4, three incremental node expansion stages of an abstract graph are shown in accordance with parallel edge partitioning. The three incremental node expansion stages expand an abstract graph exhibiting the characteristics of Hidden Markov Models with three hidden states, shown in FIG. 1. One subtle difference, however, from FIG. 1 is that each node in FIG. 4 is an abstract state that represents a set of concrete states (in the case of HMMs these are hidden states) and thus each node is labeled using capital 'S' instead of lower-case 's'. So if one abstract state corresponds to one thousand concrete states, then the problem shown in FIG. 4 is about 3 orders of magnitude larger than that in FIG. 1. Since parallel edge partitioning is designed for solving large problems, its efficiency generally increases with the size of the search problem.

As can be seen from FIG. 4, nodes that map to abstract states $S_0$, $S_1$, and $S_2$ can be expanded in parallel if the operator groups that are used to generate the successors do not interfere with one another. As noted above, operator groups are non-interfering so long as no two operator groups share the same destination abstract state (i.e., duplicate-detection scope). Starting with stage 402, a plurality of processing units incrementally expand nodes that map to abstract states $S_0$, $S_1$, and $S_2$ at $t_i$. Namely, the processing units expand nodes mapping to abstract $S_0$ using the operator group associated with the abstract edge connecting abstract state $S_0$ with itself. Further, the other processing units similarly expand abstract states $S_1$, and $S_2$. Thereafter, at stages 404 and 406 different operator groups are selected and used to further expand nodes that map to abstract states $S_0$, $S_1$, and $S_2$. Thus, after one operator group is used to expand all nodes that map to an abstract state, another operator group is chosen until all operator groups are used. Because not all successors of a node are generated by (parallel) edge partitioning when a node is expanded, the node expansion in edge partitioning is an incremental expansion. Nodes eventually become fully expanded, once all applicable operator groups are applied.

4.1 Load Balancing

The efficiency of parallel edge partitioning can be affected by a number of factors in practice. One of the most important is load balancing, which is particularly relevant to approaches to parallel search that use state-space abstraction. A static state-space projection function may not distribute nodes evenly to buckets, as some buckets may contain a lion's share of nodes while others may have nothing at all mapped to them. In the experiments discussed below, static projection functions were used for all algorithms, so as to test their ability to cope with issues of load balancing. While parallel edge partitioning by itself does not solve the load balancing problem, it can make it a less of an issue. Recall that the same source bucket can be expanded by multiple processes in parallel edge partitioning. This means that if one bucket is significantly larger, the algorithm can assign multiple processes to work on the same bucket, one for each applicable operator group. Intuitively, this is equivalent to dividing a large task into smaller pieces, and the more pieces there are, the more likely that all search processes can be kept busy.

4.2 Absence of Deadlock

One major design burden for any parallel algorithm is to prove the absence of deadlocks. Fortunately, the proof is trivially simple for parallel edge partitioning, because it breaks one of the four necessary conditions for a deadlock. In computer science, it is common knowledge that these conditions are (1) mutual exclusion, (2) hold and wait, (3) no preemption, and (4) circular wait, and that breaking any one of the four is sufficient to prevent a deadlock from happening. The condition that is never satisfied in parallel edge partitioning is "hold and wait," because once a search process gets hold of a single bucket of nodes (La, a unit resource) that is the duplicate-detection scope of an abstract edge, it has all that is needed to proceed with node expansions and there is no waiting period for a deadlock to occur. Because parallel edge partitioning is deadlock-free by design, it has no overhead for deadlock detection or avoidance.

4.3 Synchronization

While parallel edge partitioning guarantees that no synchronization is needed as long as the same operator group is used in incremental expansions, some light-weight synchronization may be needed when a processing unit switches from one operator group to another, or when the search moves from one search layer to the next. There are multiple ways of assigning operator groups to processing units, as well as ways of moving the search from the current layer to the next. Herein a single-lock scheme (hereafter referred to as single-lock parallel edge partitioning) is described due mainly to its simplicity and its straightforward correctness proof. However, the single-lock scheme is only meant to illustrate one possible embodiment of parallel edge partitioning. Accordingly, it is to be appreciated that additional schemes are equally amenable to parallel edge partitioning, such as those involving finer-grained multiple-lock schemes.

4.3.1 Single-Lock Scheme

Single-lock parallel edge partitioning, stores the following data structure:

an enabled operator group counter, op, is stored at each abstract node that keeps track of the number of its enabled operator groups for the current search layer. An operator group is enabled for a particular search layer, if and only if (1) it has not been used to generate successors for that layer and (2) its duplicate-detection scope is available (i.e., not taken by some process). Initially, the op counter of an abstract node is set to be the number of abstract successors it has in the abstract graph, and this only needs to be done for abstract nodes that contain one or more open nodes in the current layer. These abstract nodes are referred to as open abstract nodes. For all other abstract nodes, their op counters are set to zero.

a fresh bit is stored at each operator group to indicate if the operator group has not been used to generate successors for the current layer.

an available bit is stored at each operator group to indicate if its duplicate-detection scope is available.

a global op-sum counter is used to keep track of the total number of operator groups that need to be applied in order to completely expand all the nodes in the current layer. The value of the op-sum counter can be computed as the sum of the number of successors of all the open abstract nodes in the abstract graph, since the out-degree of an abstract node equals the number of operator groups that must be applied in order to fully expand nodes that map to it. The op-sum counter is decreased by one when an operator group is done generating successors for nodes in the current layer. Once the op-sum counter hits zero, it signals the search to move to a new layer.

Upon moving to a new layer, parallel edge partitioning performs the following four (re)initialization steps for all the open abstract nodes in the new layer as follows:
1) Reset their op counters to their out-degrees;
2) Set the fresh bit for all their operator groups;
3) Set the available bit for all their operator groups; and
4) Recompute the global op-sum counter.

To decide which operator group to apply next, the algorithm maintains a list of open abstract nodes that have one or more enabled operator groups for the current layer. This list hereafter referred to as the abstract open list. When the op counter of an open abstract node reaches zero, it is removed from the abstract open list.

The op counter of an abstract node can reach zero for two different reasons: (1) all of its operator groups have been used to generate successors or (2) none of its unused operator groups has a duplicate-detection scope that is available. In the first case, the abstract node should be removed from the abstract open list for the current layer. But if it is the second case, the abstract node should be put back onto the abstract open list as soon as the duplicate-detection scope of one of its unused operator groups becomes available.

To differentiate these two cases, the algorithm monitors the fresh and available bits as follows. The op counter of an abstract node is decremented when any of its operator groups' fresh bit is reset. But when an available bit is set, the op counter is incremented if and only if the fresh bit of the same operator group is set. In other words, the op counter of an abstract node counts the number of its operator groups whose fresh and available bits are both set.

Building on the foregoing, the synchronization mechanism only needs a single lock for shared memory parallelization. Upon a successful locking of the global mutex, a search process can pick an enabled operator group from any of the abstract nodes on the abstract open list, since only those with a positive op counter will be on the list. Once an enabled operator group is chosen, the search process resets the available bits of all the operator groups that interfere with the chosen one, and this may cause some abstract node(s) to be removed from the abstract open list. Then the process can release the lock and be sure that it has exclusive access to nodes in the duplicate-detection scope of the chosen operator group, even after the lock is released. When the process is done with that operator group, it needs to lock the mutex again and set all the available bits it has reset before, and this may cause some abstract node(s) to be put back onto the abstract open list. Since the size of the abstract graph is very small compared to the size of the original state-space graph, operations performed on the abstract graph can be done efficiently and require little computation. Thus, each process only needs to hold the global mutex for a tiny fraction of time and spends most of its computational effort on node expansions.

5.0 EDGE PARTITIONING IN DOMAIN-INDEPENDENT PLANNING

Before evaluating the performance of parallel edge partitioning experimentally, another potential benefit of edge partitioning in domain independent graph search is considered. This helps to put the current work into perspective.

In all published work, edge partitioning was evaluated as a technique for disk-based search, in which disk I/O operations are the major source of overhead. Those experiments showed that, in most cases, edge partitioning is slower than SDD, because it needs more disk I/O for swapping in (out) nodes stored on disk (in RAM), in order to make up for its reduced RAM requirements. But for pure internal-memory search, which is the setting focused on here, no disk I/O is needed and an interesting question is whether edge partitioning can be faster than SDD.

At first glance, this does not seem plausible because edge partitioning requires multiple incremental node expansions to fully generate the successors of a node, whereas SDD only needs a single node expansion to accomplish the same task. Although the overhead of incremental node expansions is inexpensive, it still needs more computation. Thus, the conventional wisdom about edge partitioning is that it is slower than pure structure duplicate detection. As indicated in the experiments discussed below, this is not the case. To better understand these seemingly counter-intuitive experimental results consider efficiency factors that can work in edge partitioning's favor.

First, edge partitioning focuses the duplicate-detection effort of the search algorithm on a single bucket of nodes. Thus, the code exhibits better memory-reference locality and has fewer cache misses, which can easily translate into faster runtime performance on modern processors. Second, and more importantly for domain-independent planning, edge partitioning can bring in significant savings in the amount of computation spent on precondition checking for determining which operator can be applied when a node is expanded.

Unlike domain-specific solvers, the successor generation function of a domain-independent planner is extracted automatically from the description of a problem. But the price for having a more general-purpose successor generator is that the set of operators, especially after grounding, can become fairly large. Take the 15-puzzle as an example; when formulated as a domain-independent STRIPS planning problem, it has 720 operators 2, each of which represents a unique combination of (1) the position of the blank, (2) the tile that is orthogonally adjacent to the blank and (3) the direction of a tile movement.

While all of the planners used in the following experiments perform precondition testing directly on a compact state representation and a single check can test the values of as many as 32 binary (or 16 quaternary and so on) state variables, it was found that it can still take quite some time to test the applicability of each and every operator in a set of a few hundred or thousand operators. But edge partitioning does not need to perform a linear scan of the operator table to determine which operators are applicable.

Note that edge partitioning performs operator abstraction on top of state abstraction. For an abstract edge (y,y'), edge partitioning computes $O_{y,y'}$, the set of operators that (1) are applicable in abstract node y and (2) only generate those successors that map to abstract node y'. This implies that if an operator o is not applicable in abstract node y, then o does not exist in $O_{y,y'}$, for all y', which means edge partitioning can safely ignore the operator without testing.

In the previous 15-Puzzle example, there are only 15 operators, one for each tile, in the set $O_{B_0,B_1}$ that encodes the operators for moving the blank to the right from abstract node $B_0$ to $B_1$. There are another 15 operators in the set $O_{B_0,B_4}$ that encodes the operators for moving the blank down from $B_0$ to $B_4$. Thus, for states that map to abstract node $B_0$, the total number of operators that need to be tested is 30, a reduction of 24 times compared to the original 720 grounded operators that are defined over the entire state space of the 15-Puzzle. The reduced set of operators $O_{B_0}$, which is the union of $O_{B_0,B_1}$ and $O_{B_0,B_4}$, can be viewed as a projection of the entire operator set O to the sub-space of the 15-Puzzle that maps to abstract node $B_0$, which constrains the set of operators to only the ones that are applicable in states having the blank located at the top left corner. Note that the number of applicable operators for each abstract node decreases as the resolution of the state-space abstraction increases, and so is the power of operator abstraction.

6.0 IMPLEMENTATION

Before presenting computation results, the key steps in implementing parallel edge partitioning are reviewed.

Figure 5:
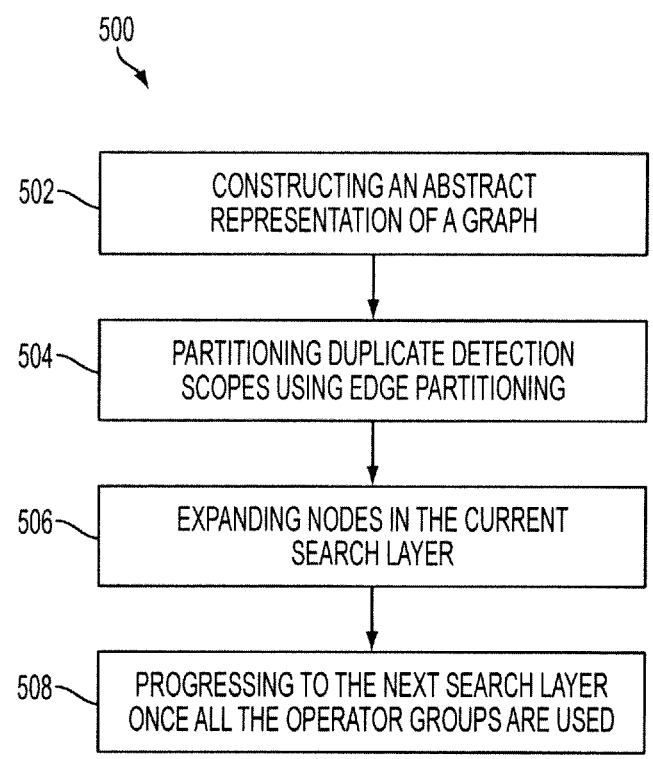
FIG. 5 illustrates a block diagram of the basic actions for obtaining a final search output using parallel edge partitioning.

With reference to FIG. 5, a block diagram of the basic actions for obtaining a final search output using parallel edge partitioning is illustrated. The diagram includes constructing an abstract representation of the graph (Action 502), partitioning the duplicate detection scopes of abstract nodes (action 504), expanding nodes in the current search layer (Action 506), and progressing to the next search layer once all operator groups are used (Action 508).

Although the diagram in FIG. 5 is illustrated and described below as a series of acts or events, the present disclosure is not limited by the illustrated ordering of such acts or events. For example, some acts may occur repeatedly and/or in different orders and/or concurrently with other acts or events apart from those illustrated and/or described herein, and not all illustrated steps may be required to implement a methodology in accordance with the present disclosure.

An abstract representation of the graph is constructed using state-space abstraction (Action 502). As discussed in detail above, this is generally constructed through the application of a state-space projection function to the graph, where a state-space projection function is a many-to-one mapping from the original state-space to an abstract state-space. Once the abstract representation of the graph is constructed, each abstract node thereof includes a duplicate detection scope. Further, each abstract edge includes an operator group.

Using edge partitioning, the duplicate detection scopes of the abstract nodes are partitioned into smaller duplicate detection scopes (Action 504). Each of the smaller duplicate detection scopes corresponds to one of the abstract edges. Advantageously, these smaller duplicate-detection scopes allow parallel searching of the graph even when the graph has no intrinsic locality.

The nodes in the current search layer are expanded (Action 506). Expansion of the nodes is accomplished through the use of the operator groups belonging to the abstract nodes to which the nodes in the current search layer map. Nodes are expanded using these operator groups until all the operator groups are used. So long as only operator groups associated with disjoint duplicate detection scopes are used at any one time, the nodes can be expanded in parallel. As should be appreciated, while the graph is searched, the set of operator groups having disjoint duplicate detection scopes varies.

Once all the operator groups for the current search layer have been used, the search proceeds to the next search layer and the foregoing action repeats (Action 508). Naturally, the above described actions, including this action, repeat until a terminate condition (e.g., a goal node) is reached. Thus, it is to be appreciated that there is not necessarily a temporal relationship between the foregoing actions. Rather, they take place concurrently and may repeat numerous times.

Figure 6:
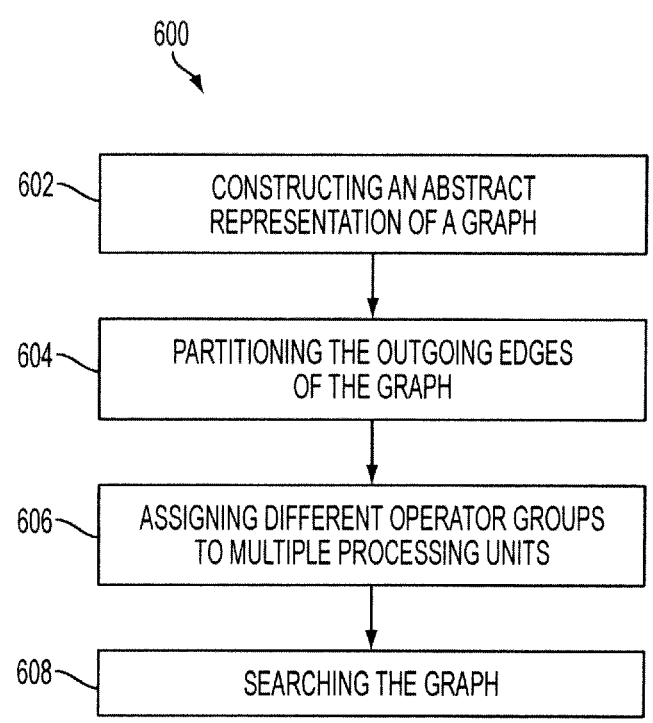
FIG. 6 illustrates a block diagram of the basic actions for obtaining a final search output using parallel edge partitioning.

With reference to FIG. 6, a block diagram of the basic actions for obtaining a final search output using parallel edge partitioning is illustrated. The diagram includes constructing an abstract representation of the graph (Action 602), partitioning the duplicate detection scopes of abstract nodes (action 604), expanding nodes in the current search layer (Action 606), and progressing to the next search layer once all operator groups are used (Action 608).

Although the diagram in FIG. 6 is illustrated and described below as a series of acts or events, the present disclosure is not limited by the illustrated ordering of such acts or events. For example, some acts may occur repeatedly and/or in different orders and/or concurrently with other acts or events apart from those illustrated and/or described herein, and not all illustrated steps may be required to implement a methodology in accordance with the present disclosure.

An abstract representation of the graph is constructed using state-space abstraction (Action 602). As discussed in detail above, this is generally constructed through the application of a state-space projection function to the graph, where a state-space projection function is a many-to-one mapping from the original state-space to an abstract state-space. Once constructed, each abstract node of the abstract representation of the graph includes a duplicate detection scope.

The outgoing edges of the graph are partitioned based on the abstract representation of the graph (Action 604). The partitioning includes grouping edges that map to a same abstract edge of the abstract representation together as an operator group. Advantageously, these operator groups allow parallel searching of the graph even when the graph has no intrinsic locality. As should be appreciated, Action 604 is very similar to Action 504 of FIG. 5.

Different operator groups (i.e., operator groups having disjoint duplicate detections scopes) are assigned to processing units until a termination condition is met (Action 606). The processing units use these different duplicate detection scopes to generate successor nodes in parallel, and, as should be appreciated, this Action is similar to Action 506 of FIG. 5, whereby attention is directed thereto.

As successor nodes are generated the graph is searched (Action 608). For example, each node in the current search layer may be tested to determine whether it meets the search criteria.

Similar to FIG. 5, the above described actions repeat until a terminate condition (e.g., an end node) is reached. Thus, it is to be appreciated that there is not necessarily a temporal relationship between the foregoing actions. Rather, they take place concurrently and may repeat numerous times.

6.1 System

Figure 7:
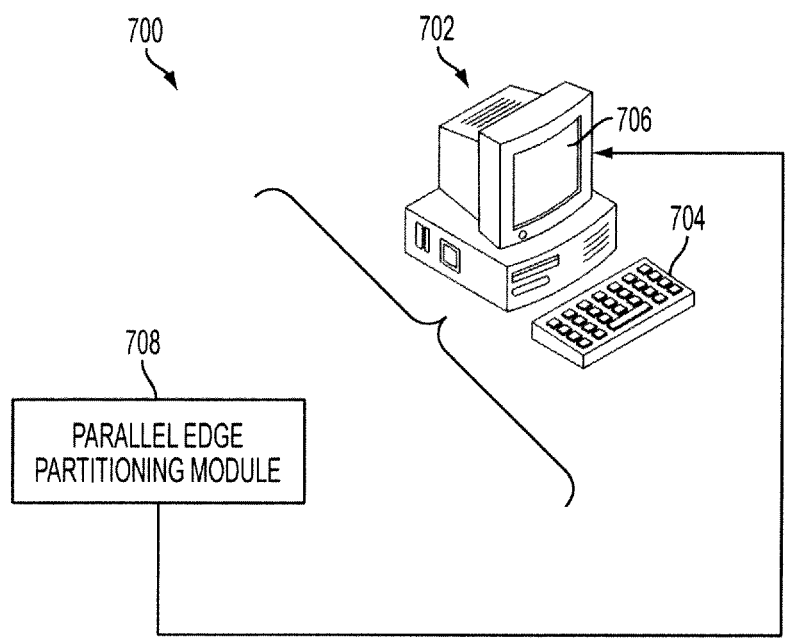
FIG. 7 illustrates a system suitably embodying parallel edge partitioning.

With reference to FIG. 7, a parallel edge partitioning system 700 is illustrated. Suitably, a computer 702 or other digital processing device, including storage and a digital processor, such as a microprocessor, microcontroller, graphic processing unit (GPU), etc., embody the system 700.

In other embodiments, the system 700 is embodied by a server including a digital processor and including or having access to digital data storage, such server being suitably accessed via the Internet or a local area network, or by a personal data assistant (PDA) including a digital processor and digital data storage, or so forth.

The computer 702 or other digital processing device suitably includes or is operatively connected with one or more user input devices such as an illustrated keyboard 704 for receiving user input to control the system 700, and further includes or is operatively connected with one or more display devices such as an illustrated display 706 for displaying output generated based on the output of the system 700. In other embodiments, the input for controlling the system 700 is received from another program running previously to or concurrently with the system 700 on the computer 702, or from a network connection, or so forth. Similarly, in other embodiments the output may serve as input to another program running subsequent to or concurrently with the system 700 on the computer, or may be transmitted via a network connection, or so forth.

The system 700 includes a parallel edge partitioning module 708 that carries out parallel edge partitioning according to the present application. Suitably, the parallel edge partitioning module 708 receives a graph from a source external to the module 708 and performs parallel edge partitioning thereon. The external source may, for example, be a file store on the computer 702 or a user of the computer 702, where the user interacts with the parallel edge partitioning module 708 via the keyboard 704.

In some embodiments, the parallel edge partitioning module 708 is embodied by a storage medium storing instructions executable (for example, by a digital processor) to implement the parallel edge partitioning. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

Figure 8:
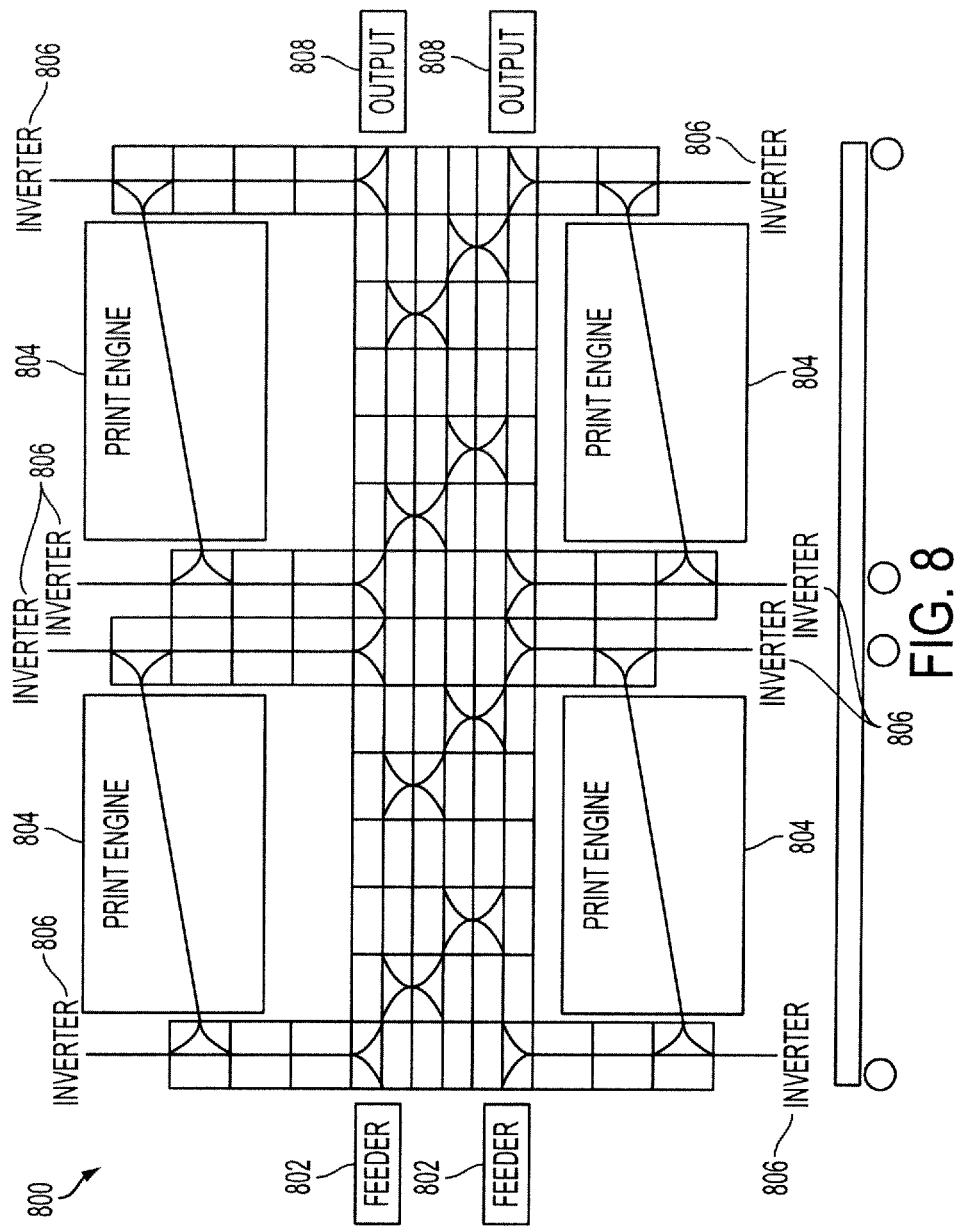
FIG. 8 illustrates a simplified side elevation view of an exemplary modular redundant printing engine in which a parallel edge partitioning finds particular application.

Turning to FIG. 8, a modular redundant printing system 800 is illustrated exemplifying one practical application of the parallel edge partitioning system of FIG. 7 is discussed above. The system 800 includes 197 independent modules including feeders 802, marking (print) engines 804, redirectors or inverters 806, finishers, and output trays 808, etc. The modules work together to produce a variety of printed products.

Parallel edge partitioning is particularly suited for use in planning the distribution of print jobs across the print engines 804. Namely, parallel edge partitioning can be used to solve planning problems. For example, parallel edge partitioning can be used to find the shortest path from a feeder 802 to an output tray 808 taking into account that certain print engines 804 may be in dispose. In another example, parallel edge partitioning can be used to schedule print jobs so as to minimize delay. To map the planning problem a graph, system states are treated as nodes of a graph and relations between system states are treated as edges of the graph. Edge weights may, but need not be, time, distance, cost, or the like. A plan then comprises an arrangement of system states.

Notwithstanding that the parallel edge partitioning system 700 of FIG. 7 is suitably employed within a print system, it is to be appreciated that the parallel edge partitioning system may suitably be employed within other systems using graph searching. For example, the parallel edge partitioning system 700 of FIG. 7 may alternatively be employed within route planning systems and/or methods. That is to say, parallel edge partitioning may alternatively be employed to find the shortest or fastest path between two locations.

7.0 EXPERIMENTAL RESULTS

Parallel edge partitioning (PEP) was implemented in a domain independent STRIPS planner that uses as its underlying search algorithm a breadth-first heuristic search (Zhou & Hansen 2006a). The reason for using a breadth-first heuristic search is that it uses memory more efficiently than its best-first search counterparts, such as A*.

The search algorithm uses forward state-space planning to find optimal sequential plans, guided by an admissible pattern database heuristic. The planner was tested in eight benchmark domains from the biennial planning competition. All planners used in the experiments were implemented in C and compiled with the same optimization level using gcc. Experiments were performed on dual quad-core Intel Xeon X5450 3.0 GHz processors limited to roughly 2 GB of RAM.

Before going into the details of the experimental results, take note of the following. First, it is not fair to compare a breadth-first search heuristic algorithm with a best-first search algorithm like A* or its parallel variants, such as HDA* and PBNF, simply on the grounds of parallel-speedup ratios. There are at least two reasons why such a seemingly objective comparison is unfair to a breadth-first heuristic search algorithm whose primary mission is to save memory.

Reason #1: The underlying rationale for using a breadth-first heuristic search instead of a best-first approach to heuristic search is that the former induces a smaller search frontier than the latter. Moreover, such a difference increases as the search heuristic gets more accurate. Since the frontier (i.e., the Open list) can be seen as a snapshot of the "workload" of the search algorithm, A* has the natural advantage of having more (potentially concurrent) work to do than breadth-first heuristic search, which is forced to work with fewer open nodes.

Reason #2: The parallel version of breadth-first heuristic search described herein uses layer-based synchronization to save memory even further. As such, search threads have a higher chance of starving as they approach the end of a layer. HDA* and PBNF, on the other hand, are not affected by this, since they are not layer based. However, unlike PEP, the memory requirements can increase with the number of threads used.

Despite all these disadvantages, experiments show parallel edge partitioning compares favorably with all the other algorithms on all thread counts. The only exception is blocks-10 for which parallel edge partitioning needed more incremental expansions than the number of nodes generated (which means on average more than one group of operators is needed to generate even a single successor—a rarely observed characteristic in the planning instances tested).

FIG. 9 includes a table 900 comparing the performance of parallel structured duplicate detection (PSDD) with that of parallel edge partitioning (PEP). These problems are the largest in each of the eight domains that can be solved within 2 GB of RAM. The table 900 shows a couple of interesting things. First, it shows that PEP needs an average of one order of magnitude more incremental node expansions than PSDD needs full node expansions, and yet it is still significantly faster. This reflects the improved efficiency of successor generation as a result of faster precondition checking, thanks to operator abstraction in edge partitioning. Second, it shows that PEP can be equally or more effective with a coarser abstraction function than PSDD. On average, the size of the abstract graph (shown in columns labeled |Ĝ|) used in PEP is more than 10 times smaller than that used in PSDD. A smaller abstract graph not only saves RAM, it is also faster to traverse and manipulate. Interestingly, PEP can leverage sufficient concurrency out of an abstract graph with as few as 64 abstract nodes. Note that if PSDD (or PBNF for that matter) used an abstract graph that small, its wall-clock running time would be significantly worse than what is presented in the table 900.

To compare with state-of-the-art parallel search algorithms, FIG. 10 includes a table 1000 showing the runtime performance of HDA* and PBNF (the livelock-free version) on the same set of planning problems. HDA* was implemented as a shared memory version using the same code base as all the other algorithms to minimize differences in implementation. PBNF used the original implementation as described in (Burns, E.; Lemons, S.; Zhou, R.; and Ruml, W. 2009b. Bestfirst heuristic search for multi-core machines. In *Proceedings of the 21st International Joint Conference on Artificial Intelligence (IJCAI-09)*, 449-455). All algorithms used the same admissible heuristic (computed by the same C code). The table 1000 shows that both HDA* and PBNF are less memory-efficient than breadth-first heuristic search, and that they run significantly slower than PEP. One interesting observation is that PBNF ran out of memory on satellite-5 with 7 threads, but not with 2 threads. Unlike PEP, PBNF's memory requirements can increase with the number of threads used. On satellite-5, PBNF's peak number of nodes stored in RAM is roughly 16, 32, and 54 million nodes for 1, 2, and 4 threads.

PEP was also run on hard instances of the 15-Puzzle formulated as STRIPS planning problems. The instances shown in a table 1100 of FIG. 11 are among the most difficult ones from Korf's 100 15-Puzzle instances (the column labeled '#' shows the instance number). Previously, the best domain independent solver was able solve 93 of them in hours. PEP, however, can solve 95 of them in minutes, using a domain-independent pattern database heuristic (equivalent to the Manhattan-Distance heuristic for domain-specific solvers). Note that none of the instances in the table 1100 can be solved by HDA* or PBNF, since both ran out of memory well before any instance could be solved.

8.0 CONCLUSION

The foregoing describes a parallel version of the edge partitioning technique that is guaranteed to be applicable even when the underlying search graph has no locality, unlike previous approaches to parallel structured duplicate detection that depend heavily on graph locality to be effective. For search graphs that have local structure, parallel edge partitioning can increase the amount of concurrency that is possible. In addition, it improves memory reference locality, which can improve cache performance. In domain-independent planning, it also provides significant speedup from faster precondition checking. As a result, parallel edge partitioning runs faster than parallel structured duplicate detection even on a single thread. In summary, parallel edge partitioning is both more general and more efficient than its predecessor, parallel structured duplicate detection.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method, performed by one or more processors, for searching a graph in parallel, said method comprising:
constructing a representation of the graph using state-space technique, wherein the representation of the graph includes one or more nodes having duplicate detection scopes and one or more edges having operator groups;
partitioning the duplicate detection scopes of the nodes into smaller duplicate detection scopes using edge partitioning, wherein the edges are used to define the smaller duplicate detection scopes;
expanding nodes in the current search layer using the operator groups of outgoing edges of the nodes the nodes map to, wherein the expanding expands the nodes in parallel using operator groups associated with edges having disjoint duplicate detection scopes, wherein the expanding is performed by a processing unit of the one or more processors; and,
progressing to the next search layer once all the operator groups in the current search layer have been used for node expansions;
wherein each node includes an enabled operator group counter that keeps track of the number of operator groups currently enabled for the node;
wherein each operator group keeps track of whether:
(i) all operators in the operator group have been used to generate successors for a current search layer, and
(ii) a duplicate detection scope of the operator group is currently being used to generate successors; and
wherein the method further includes:
in response to all operators in the operator group being used to generate successors for the current search layer, decrementing the enabled operator group counter of the node corresponding to the operator group;
in response to the duplicate detection scope of the operator group not currently being used and not all operators in the operator group being used to generate successors for the current search layer, incrementing the enabled operator group counter of the node corresponding to the operator group; and,
maintaining an open list of nodes with enabled operator group counters exceeding zero, wherein the expanding uses enabled operator groups from the nodes of the open list; and,
storing the one or more nodes as a single nblock of nodes in a Random Access Memory (RAM).

2. The method of claim 1, wherein the nodes are comprised of nodes of the graph, wherein the nodes of the graph map to the nodes under a state-space projection function.

3. The method of claim 2, wherein a first node of the nodes is a successor of a second node of the nodes when a first node of the graph is a successor of a second node of the graph, the first node maps to the first node under the state-space projection function, and the second node maps to the second node under the state-space projection function.

4. The method of claim 1, wherein the duplicate-detection scope for an edge is comprised of nodes of the graph mapping to a destination of the edge.

5. The method of claim 1, wherein the duplicate-detection scope for an edge is guaranteed to contain only nodes of the graph that map to a single node, regardless of the structure of the representation of the graph.

6. The method of claim 1, wherein the edge partitioning includes using an operator-grouping procedure to divide a set of applicable operators $O_y$ for an node y into operator groups, one for each successor of y, wherein an operator group $O_{y,y'}$ is a subset of the applicable operators $O_y$ that consists of all operators that are associated with the edge (y, y').

7. The method of claim 1, wherein the expanding includes generating successor nodes through incremental node expansion.

8. The method of claim 1, wherein the expanding uses a single lock synchronization scheme.

9. The method of claim 8, wherein the single lock synchronization scheme maintains an enabled list of nodes having one or more enabled operator groups for the current search layer.

10. The method of claim 9, wherein an operator group is enabled in response to the operator group not being used for expansion in the current search layer and its duplicate detection scope not being in current use.

11. The method of claim 9, wherein the operator groups used to expand the nodes in parallel are selected from the enabled list.

12. The method of claim 1, wherein the expanding includes selecting operator groups associated with edges having disjoint duplicate detection scopes, wherein the selecting includes:
locking a global mutex;
selecting an enabled operator group;
disabling other enabled operator groups having a same duplicate detection scope as the selected operator group; and,
releasing the global mutex.

13. The method of claim 1, wherein the expanding includes re-enabling operator groups when use of an operator group is complete, wherein the re-enabling includes:
locking a global mutex;
enabling operator groups which have not be used in the current search layer and have a same duplicate detection scope as the operator group; and,
releasing the global mutex.

14. The method of claim 1, wherein the graph is a search graph for a planning problem in which nodes of the graph correspond to planning states and edges correspond to transitions between system states.

15. The method of claim 1, wherein the ratio between maximum out-degree of the representation and the size of the representation is one, and wherein the expanding includes expanding nodes corresponding to the node with the maximum out-degree of the representation in parallel.

16. A system for performing a graph search comprising:
a computing system having at least a computing section, an I/O and memory, the computing section programmed to:
construct a representation of the graph using state-space technique, wherein the representation of the graph includes one or more nodes having duplicate detection scopes and one or more edges having operator groups, and wherein the ratio between maximum out-degree of the representation and the size of the representation is one;
partition the duplicate detection scopes of the nodes into smaller duplicate detection scopes using edge partitioning, wherein the edges are used to define the smaller duplicate detection scopes;
expand nodes in a current search layer using the operator groups of outgoing edges of the nodes the nodes map to, wherein the expanding expands the nodes in parallel using operator groups associated with edges having disjoint duplicate detection scopes, wherein the expanding is performed by a processing unit and includes expanding nodes corresponding to the node with the maximum out-degree of the representation in parallel; and,
progress to the next search layer once all the operator groups in the current search layer have been used for node expansion;
wherein each node includes an enabled operator group counter that keeps track of the number of operator groups currently enabled for the node;
wherein each operator group keeps track of whether:
(i) all operators in the operator group have been used to generate successors for a current search layer, and
(ii) a duplicate detection scope of the operator group is currently being used to generate successors; and
wherein the computing section is further programmed to:
in response to all operators in the operator group being used to generate successors for the current search layer, decrement the enabled operator group counter of the node corresponding to the operator group;
in response to the duplicate detection scope of the operator group not currently being used and not all operators in the operator group being used to generate successors for the current search layer, increment the enabled operator group counter of the node corresponding to the operator group; and,
maintain an open list of nodes with enabled operator group counters exceeding zero, wherein the expanding uses enabled operator groups from the nodes of the open list;
wherein the memory comprises a Random Access Memory (RAM) configured to store the one or more nodes as a single nblock of nodes.

17. The system of claim 16, wherein the duplicate-detection scope for an edge is comprised of nodes of the graph mapping to a destination of the edge.

18. The method of claim 16, wherein the edge partitioning includes using an operator-grouping procedure to divide a set of applicable operators $O_y$ for an node y into operator groups, one for each successor of y, wherein an operator group $O_{y,y'}$ is a subset of the applicable operators $O_y$ that consists of all operators that are associated with the edge (y, y').

19. A method, performed by one or more processors, for searching a graph in parallel, said method comprising:
constructing a representation of the graph using state-space technique, wherein the representation of the graph includes one or more nodes having duplicate detection scopes and one or more edges having operator groups;
partitioning the duplicate detection scopes of the nodes into smaller duplicate detection scopes using edge partitioning, wherein the edges are used to define the smaller duplicate detection scopes;
expanding nodes in the current search layer using the operator groups of outgoing edges of the nodes the nodes map to, wherein the expanding expands the nodes in parallel using operator groups associated with edges having disjoint duplicate detection scopes, wherein the expanding is performed by a processing unit of the one or more processors; and, progressing to the next search layer once all the operator groups in the current search layer have been used for node expansions;

wherein each node includes an enabled operator group counter, wherein each operator group includes a fresh bit and an available bit, the fresh bit indicating when the operator group has not been used to generate successors for a current search layer, and the available bit indicating when a duplicate detection scope of the operator group is not currently being used, and wherein the method further includes:

in response to the fresh bit of an operator group being reset, decrementing the enabled operator group counter of the node corresponding to the operator group;

in response to the available bit of an operator group being set and the fresh bit of the operator group being set, incrementing the enabled operator group counter of the node corresponding to the operator group; and, maintaining an open list of nodes with enabled operator group counters exceeding zero, wherein the expanding uses enabled operator groups from the nodes of the open list;

storing the one or more nodes as a single nblock of nodes in a Random Access Memory (RAM).

20. A system for performing a graph search comprising:

a computing system having at least a computing section, an I/O and memory, the computing section programmed to:

construct a representation of the graph using state-space technique, wherein the representation of the graph includes one or more nodes having duplicate detection scopes and one or more edges having operator groups, and wherein the ratio between maximum out-degree of the representation and the size of the representation is one;

partition the duplicate detection scopes of the nodes into smaller duplicate detection scopes using edge partitioning, wherein the edges are used to define the smaller duplicate detection scopes;

expand nodes in a current search layer using the operator groups of outgoing edges of the nodes the nodes map to, wherein the expanding expands the nodes in parallel using operator groups associated with edges having disjoint duplicate detection scopes, wherein the expanding is performed by a processing unit and includes expanding nodes corresponding to the node with the maximum out-degree of the representation in parallel; and, progress to the next search layer once all the operator groups in the current search layer have been used for node expansion;

wherein each node includes an enabled operator group counter, wherein each operator group includes a fresh bit and an available bit, the fresh bit indicating when the operator group has not been used to generate successors for a current search layer, and the available bit indicating when a duplicate detection scope of the operator group is not currently being used, and wherein the computing section is further programmed to:

in response to the fresh bit of an operator group being reset, decrement the enabled operator group counter of the node corresponding to the operator group;

in response to the available bit of an operator group being set and the fresh bit of the operator group being set, increment the enabled operator group counter of the node corresponding to the operator group; and, maintain an open list of nodes with enabled operator group counters exceeding zero, wherein the expanding uses enabled operator groups from the nodes of the open list;

wherein the memory comprises a Random Access Memory (RAM) configured to store the one or more nodes as a single nblock of nodes.

\* \* \* \* \*